United States Patent
Jones

(10) Patent No.: US 11,746,542 B2
(45) Date of Patent: *Sep. 5, 2023

(54) COVE BASE WITH CHANNEL FOR SEALANT

(71) Applicant: Larry Jones, Orient, OH (US)

(72) Inventor: Larry Jones, Orient, OH (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/376,759

(22) Filed: Jul. 15, 2021

(65) Prior Publication Data

US 2021/0404192 A1 Dec. 30, 2021

Related U.S. Application Data

(63) Continuation-in-part of application No. 16/214,545, filed on Dec. 10, 2018, now Pat. No. 11,072,931, which is a continuation-in-part of application No. 16/185,261, filed on Nov. 9, 2018, now Pat. No. 10,655,344.

(51) Int. Cl.
*E04F 19/04* (2006.01)
*E04F 19/06* (2006.01)
*H02G 3/04* (2006.01)

(52) U.S. Cl.
CPC ........ *E04F 19/045* (2013.01); *E04F 19/0477* (2013.01); *E04F 19/061* (2013.01); *E04F 2019/044* (2013.01); *E04F 2019/0422* (2013.01); *E04F 2019/0454* (2013.01); *H02G 3/0425* (2013.01)

(58) Field of Classification Search
CPC . E04F 19/061; E04F 2019/044; E04F 19/045; E04F 19/0477; E04F 2019/0454; E04F 19/04; E04F 2019/0422; E04F 19/0463; E04F 19/0468; H02G 3/0425
USPC .................................... 52/287.1, 288.1, 290
See application file for complete search history.

(56) References Cited

U.S. PATENT DOCUMENTS

| | | | |
|---|---|---|---|
| 1,585,960 A | 5/1926 | Baum | |
| 1,722,660 A | 7/1929 | Connelly | |
| 2,178,501 A | 10/1939 | Stancampiano et al. | |
| 2,230,688 A | 2/1941 | Irwin | |
| 3,201,909 A | 8/1965 | Grun | |
| 3,222,837 A | 12/1965 | Daley | |
| 3,449,873 A | 6/1969 | Damato et al. | |
| 4,165,577 A * | 8/1979 | Shanahan | A01M 1/223 43/99 |
| 4,319,528 A | 3/1982 | Gutridge et al. | |

(Continued)

OTHER PUBLICATIONS tarkettna.com, TightLock Wall Base Systems webpage, Nov. 19, 2018, 1 page.

(Continued)

*Primary Examiner* — Brent W Herring
(74) *Attorney, Agent, or Firm* — Standley Law Group LLP; Jeffrey S. Standley; Adam J. Smith

(57) ABSTRACT

Wall bases and methods for utilizing the same are provided. A rear surface of the wall base is configured to be secured to an adjacent forward surface of a wall. An extension member extends outward and downward from the base member, and a protrusion extends downward from the extension member. A channel for sealant is defined, at least in part, by the extension member and the protrusion. The protrusion may be separately formed from the extension member and base member.

18 Claims, 17 Drawing Sheets

(56) References Cited

U.S. PATENT DOCUMENTS

| | | | |
|---|---|---|---|
| 4,411,112 | A | 10/1983 | Golden |
| 4,829,731 | A | 5/1989 | Schluter |
| 5,010,703 | A | 4/1991 | Pearlman et al. |
| 5,212,923 | A | 5/1993 | Pelosi et al. |
| 5,367,842 | A | 11/1994 | Janesky |
| 5,598,681 | A | 2/1997 | DiGianni |
| 6,189,276 | B1 | 2/2001 | Pinto et al. |
| 6,282,855 | B1 | 9/2001 | Shipton |
| 6,324,799 | B1 | 12/2001 | Salvitti |
| 6,802,161 | B1 | 10/2004 | Robinson |
| 7,404,272 | B2 | 7/2008 | Piche |
| 7,703,249 | B2 | 4/2010 | Rachak |
| 7,797,900 | B2 | 9/2010 | Sondermann |
| 8,572,919 | B1 | 11/2013 | Neill et al. |
| 8,729,408 | B2 | 5/2014 | Pawlak |
| 8,973,321 | B2 | 3/2015 | Pelosi |
| 8,997,414 | B2 | 4/2015 | Fletcher |
| 9,464,429 | B2 | 10/2016 | Johnson |
| 9,970,202 | B2 | 5/2018 | Kimel |
| 2008/0005986 | A1 | 1/2008 | Thompson |
| 2008/0134602 | A1 | 6/2008 | Schick |
| 2010/0186329 | A1 | 7/2010 | Buys |
| 2011/0108318 | A1 | 5/2011 | Pawlak |
| 2014/0137496 | A1 | 5/2014 | Fletcher |
| 2015/0252561 | A1 | 9/2015 | Johnson |
| 2016/0215508 | A1 | 7/2016 | Kimel |

OTHER PUBLICATIONS homedepot.com, Cove Base search results webpage, Nov. 9, 2018, 3 pages.
SpeedCove, Inc. d.b.a Solid Rock Enterprises, SpeedCove webpage (www.speedcove.com), Oct. 29, 2018, 4 pages.
Easycove, www.easycove.com webpage, Oct. 29, 2018, 4 pages.
Rocktred, Easycove, https://rocktred.com/easycove.php, Oct. 22, 2018, 5 pages.
Diybasement Youtube Page, How to Seal a Wet Basment Watertight, https://www.youtube.com/watch?time_continue=74&v=N1vu0F6qgOA, Sep. 22, 2017, 1 page.
waterproof.com, SealOnce Basement System webpage, https://waterproof.com/products/sealonce-basement-system-main-section/, Oct. 16, 2018.
Larry Jones, photos of Existing Baseboards, Oct. 22, 2018.

* cited by examiner

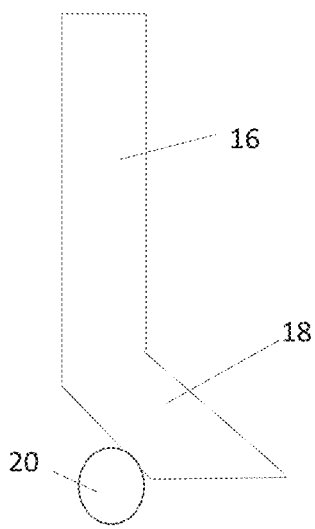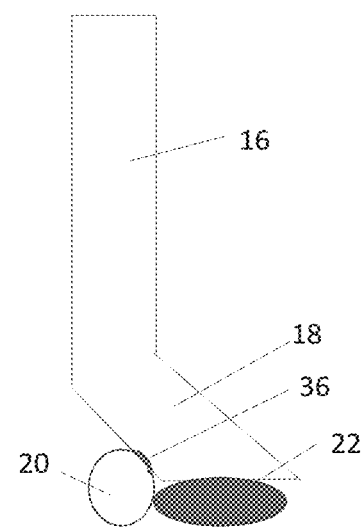
Figure 13A                    Figure 13B

COVE BASE WITH CHANNEL FOR SEALANT

CROSS-REFERENCE TO RELATED APPLICATION

This application is a continuation-in-part of U.S. application Ser. No. 16/214,545 filed Dec. 10, 2018, which is a continuation-in-part of U.S. application Ser. No. 16/185,261 filed Nov. 9, 2018, the disclosures of each of which are hereby incorporated by reference as if restated fully herein.

TECHNICAL FIELD

Exemplary embodiments of the present invention relate generally to a cove base with a channel for receiving a sealant.

BACKGROUND AND SUMMARY OF THE INVENTION

Wall base is a trim item used for decorative and functional purposes. Wall base is typically positioned at the bottom of a wall where the wall meets the floor. The wall base provides a decorative element and also serves to cover the otherwise unsightly meeting of the wall and the floor. Sometimes, the wall base is secured to the wall by nails or other fasteners. Other times, the wall base is secured to the wall by way of an adhesive. In many cases, installation of the wall base results in various size and shape gaps between the wall base and the floor. Sometimes such gaps are caused by uneven floors. Other times, such gaps appear over time as the building shifts and settles.

An improper seal between the wall base and the wall or floor can be problematic in many environments. For example, without limitation, hospitals and other medical care facilities often treat patients who may expel bodily fluids on the floor. When cleaning, excess fluids may be inadvertently forced into such gaps between the wall base and the floor or wall. The lingering presence of fluids may promote the growth and release of bacteria and other germs into the surrounding environment. A similar experience may be found with restrooms. Even in more common applications such as but not limited to a home or business, moisture may leak into such gaps resulting in mold, bacteria growth, rust, and the like.

Sometimes a sealant may be provided on or around the wall base to further secure the wall base in position and/or to seal such gaps. However, it is difficult to provide the even and consistent bead of sealant along a wall base required to maintain an aesthetically pleasing appearance and proper seal. The terms "wall base", "cove base", "base moulding", "base moulding strip", etc., are but a few of the commercial terms used for such products, which are known to those of ordinary skill in the art of building construction and are used interchangeably herein to have the same general meaning. Often times, cove bases are comprised of a flexible type material, which makes the application of a sealant particularly difficult. To further complicate matters, cove bases may comprise a shoe portion which extends away from the wall to the floor and a bottom edge which contacts the floor. The addition of such features may make application of a sealant even more difficult.

Therefore, what is needed is a cove base with a channel for receiving a sealant. The present invention is cove base with a channel for receiving a sealant.

A portion of the cove base described as an elongate base member may be configured to extend along parallel to the wall when installed. Another portion described as a shoe protrusion may extend outward from the wall at an angle from the wall when installed. The shoe protrusion may be configured to extend downward and may include a radius angle which extends away from the wall. A heel may extend from the shoe protrusion and may be configured to contact the floor. The space between the heel portion, the shoe protrusion, and the floor may define a channel for the sealant when installed. The heel portion may be substantially cylindrical in shape, though any shape and size is contemplated. The heel portion may extend towards the base.

It may be desirable to form certain pieces of the cove base separately, such as to address manufacturing complexity issues and/or simplify installation. For example, portions of the cove base may be formed by an extrusion process and rolled into a large coil for convenient transportation and installation. In exemplary embodiments, the heel portion may be selectively attachable to the base member and/or the shoe protrusion. In this manner, the heel portion may be added to the cove base, such as prior to, during, or after installation of other portions of the cove base, such as the base member and shoe protrusion which may be separately formed. The heel portion may be separately formed, such as by an extrusion processes, coiled, and transported separately, for example. In such exemplary embodiments, the heel portion may be attachable to the base member and/or the shoe protrusion by way of one or more adhesives (glue, tape, combinations thereof, or the like), press fit, snap fit, tongue and groove, slot and mating protrusion, combinations thereof, or the like. Alternatively, or additionally, connection of the heel portion to the base member and/or the shoe protrusion may be accomplished by the sealant deposited within the channel.

Further features and advantages of the devices and systems disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 13A is a side sectional view of another exemplary embodiment of the cove base of FIG. 1 with another exemplary attachable heel portion;

FIG. 13B is a side sectional view of the cove base of FIG. 13A further secured to the shoe protrusion;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
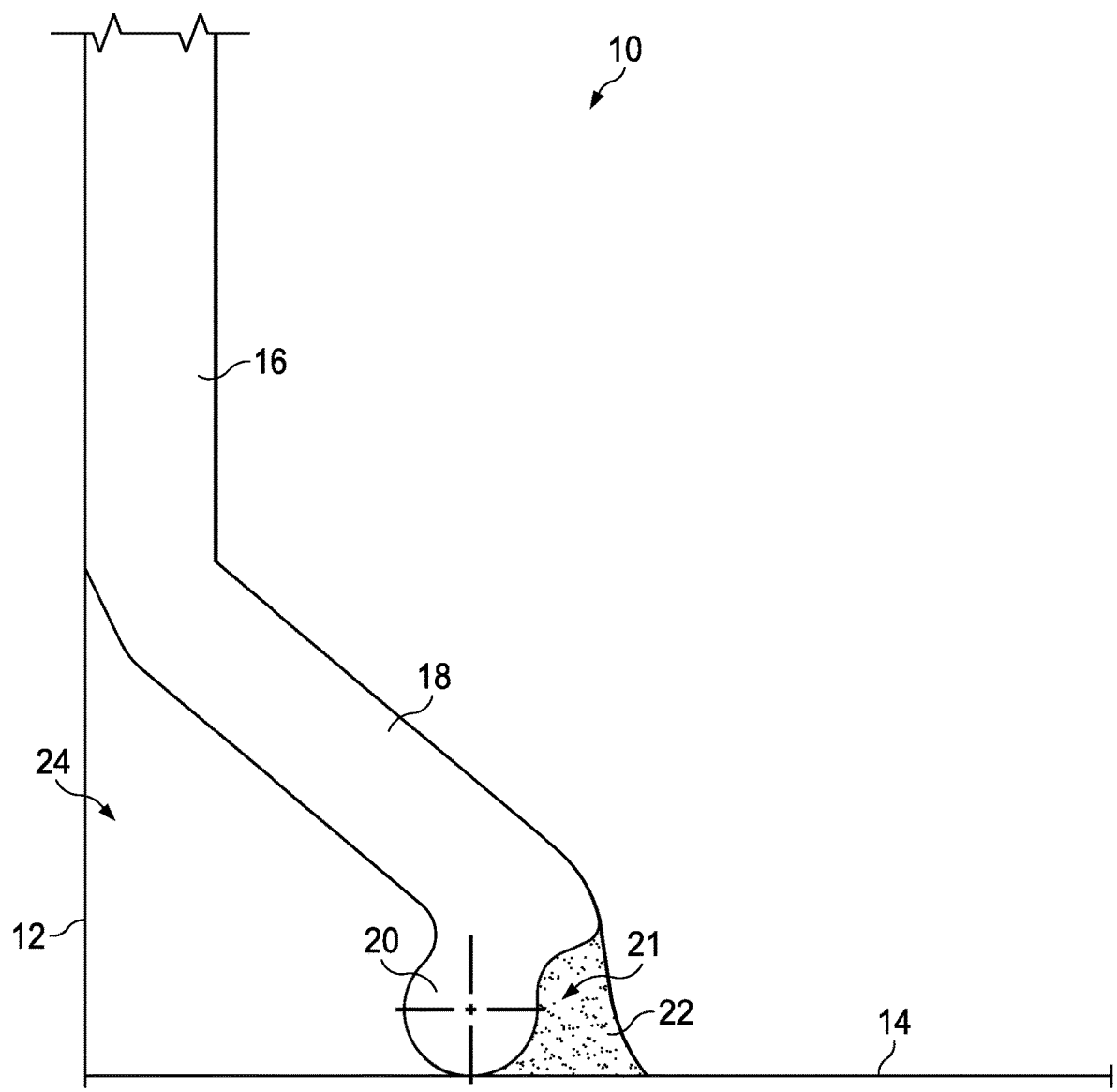
FIG. 1 is a side sectional view of an exemplary cove base in accordance with the present invention.

FIG. 1 is a side sectional view of an exemplary cove base 10. The cove base 10 may comprise an elongate base member 16. The base member 16 may extend in a substantially vertical direction. The base member 16 may be configured to extend along a portion of a wall 12 when installed. The wall 12 may be comprised of drywall, metal, wood, vinyl, some combination thereof, or the like. Any wall 12 material is contemplated. The cove base 10 may further comprise a shoe protrusion 18. The shoe protrusion 18 may extend at an angle from the base member 16. The shoe 18 may be configured to extend away from the wall 12 and towards a floor 14 when installed. Any angle is contemplated. The floor 14 may be the ground or a raised floor such as, but not limited to, vct, tile, vinyl, linoleum, hardwood, artificial wood, concrete, some combination thereof, or the like. A cavity 24 may be formed between the shoe protrusion 18, a heel portion 20, the wall 12, and the floor 14 when installed. In exemplary embodiments, the floor 14 may be installed before the cove base 10 is installed, though such is not required.

The heel portion 20 may extend from the shoe protrusion 18. The heel portion 20 may be configured to extend to the floor 14 when installed. In exemplary embodiments, the heel portion 20 may be substantially cylindrical in shape and extend along the shoe protrusion 18 such that the heel portion 20 comprises a substantially circular cross section when viewed from the side. It is contemplated that the heel portion 20 may be any size and shape. The heel portion 20 may comprise any size and shape cross section. Furthermore, the size and shape of the heel portion 20 may vary. The heel portion 20, for example without limitation, may be any straight line or curved shape for receiving a sealant 22. In exemplary embodiments, the floor 14 may be configured to provide a proper or seal when placed into contact with the sealant 22. For example, without limitation, the floor 14 may be comprised of a hard, rigid, or semi-rigid material.

In exemplary embodiments, the heel portion 20 may extend towards the base member 16 relative to the front edge of the shoe protrusion 18. In other exemplary embodiments, the heel portion 20 may be located a distance towards the base member 16 relative to the front edge of the shoe protrusion 18. Stated another way, the heel portion 20 may extend towards, or be located a distance towards, the wall 12 when installed. A channel 21 may be defined by the space between a lower edge of the shoe protrusion 18 and a front surface of the heel portion 20. The channel 21 may be configured to receive the sealant 22. The sealant 22 may be placed within the channel 21 and may be used to provide a sealed connection between the cove base 10 and the floor 14 when installed. More specifically, in exemplary embodiments, the channel 21 may be defined by the space between the lower edge of the shoe, the front surface of the heel portion 20, and an upper surface of the floor 14 when installed.

The channel 21 may be configured to receive a sealant 22. The sealant 22 may be any kind of sealant, such as but not limited to, caulk, adhesive, epoxy, urethane, wax, polyurea, some combination thereof, or the like. The sealant 22 may be placed in the channel 21 before or after the channel 21 is placed into contact with the floor 14.

The cove base 10 may be comprised of rigid or flexible materials. The cove base 10, including the base member 16, the shoe protrusion 18, and the heel portion 20, may be comprised of a rubber, plastic, polymer, vinyl, wood, metal, thermoplastic, vulcanized thermoset, some combination thereof, or the like. The various components of the cove base 10, such as the base member 16, the shoe protrusion 18, and the heel portion 20, may be comprised of the same or different materials.

Installation of the cove base 10 may be performed by cutting the cove base 10 to a specified length. In other exemplary embodiments, the cove base 10 may be received in a predetermined size such that cutting is not required.

Adhesive may be placed along the rear surface of the base member 16 and/or along a corresponding section of the wall 12. The base member 16 may be placed in contact with the wall 12 and the adhesive may be allowed to cure. Alternatively, or in addition, fasteners may be driven though the base member 16 to secure the base member 16 to the wall 12. The base member 16 may be secured against the wall 12 such that the heel portion 20 contacts the floor 14. A layer of sealant 22 may be provided within the cavity 21 such that the sealant 22 is in contact with the heel portion 20 and the floor 14. Alternatively, in or in addition, the layer of sealant 22 may be provided along the floor 14 and the cove base 10 may be positioned such that the sealant 22 fills the cavity 21. Regardless, the sealant 22 may be smoothed. Excess sealant 22 may be removed. The sealant 22 may be allowed to cure.

In exemplary embodiments, an existing cove base 10 may be modified to form a channel 21 configured to receive the sealant 22.

Figure 2:
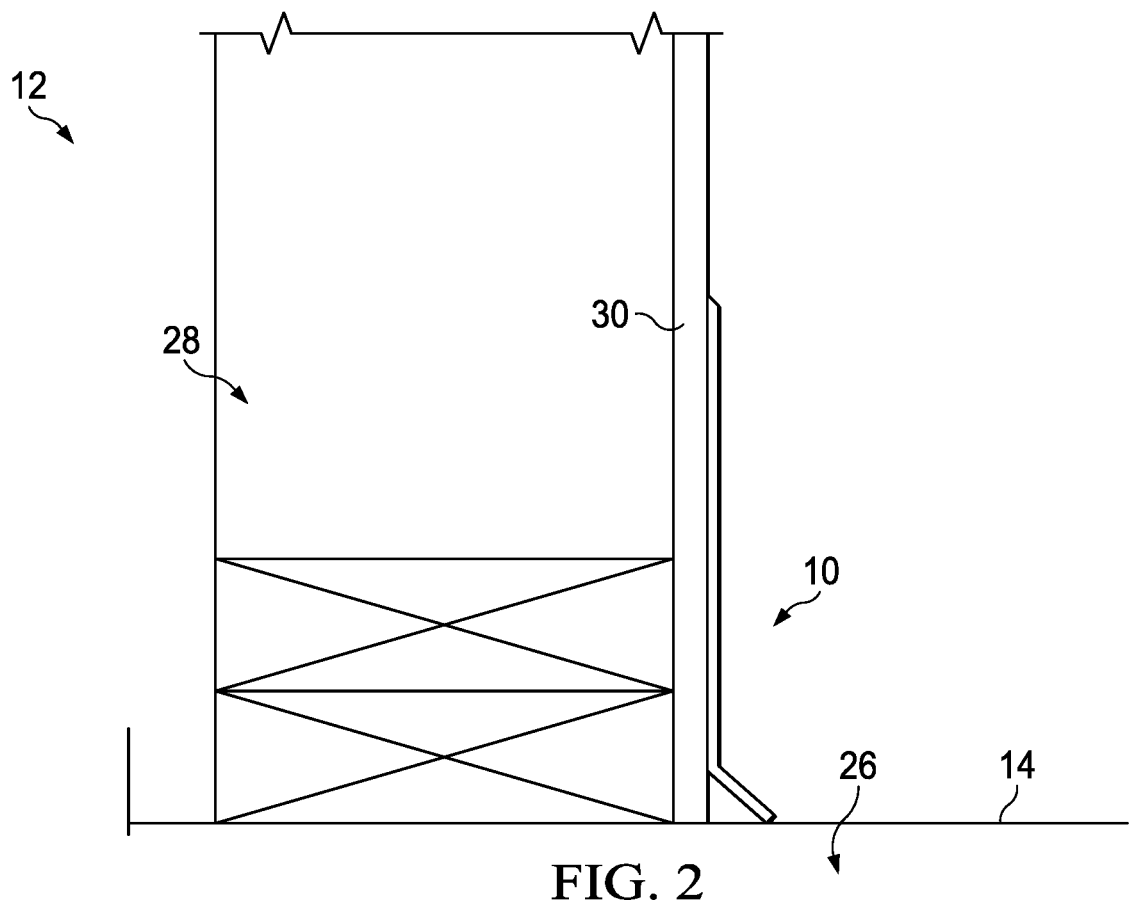
FIG. 2 is a side sectional view of an exemplary installed cove base.

FIG. 2 is a side sectional view of an exemplary installed cove base 10. A firestop 28 may be provided within the wall 12. A drywall section 30 may be located between the firestop 28 and cove base 10. The cove base 10 may extend over some or all of the drywall section 30. Concrete or another foundation material 26 may be provided below the floor 14. It is notable that the entire floor 14 may not be level such that periodic gaps or various shapes and sizes may occur between the wall 12 and the floor 14. The cove base 10 may be used, in part, to cover these gaps. However, these gaps can provide a space for bacteria, mold, insects, moisture, and the like. The use of a sealant 22 between the cove base 10 and the floor 14 may provide a proper seal to help prevent, or eliminate, the existence of bacteria, mold, insects, moisture, and the like. The channel 21 may provide a convenient and efficient space for a bead of the sealant 22 to be placed between the cove base 10 and the floor 14 when installed.

Figure 3:
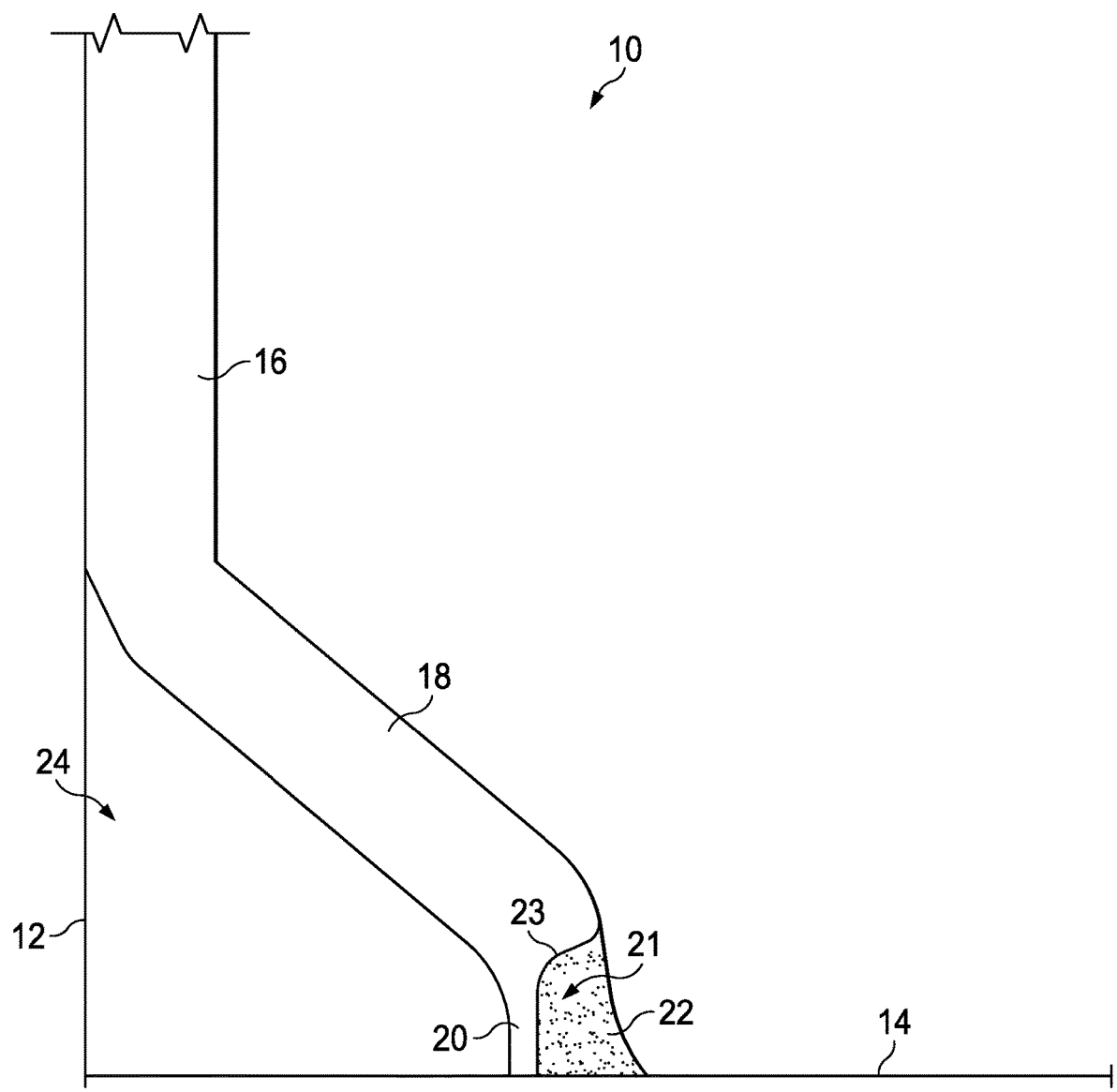
FIG. 3 is a side sectional view of another exemplary embodiment of the cove base.

FIG. 3 is a side sectional view of another exemplary embodiment of the cove base 10. The heel portion 20 may comprise a curved section 23 which may extend from the floor 14 to the shoe protrusion 18, when installed, to define a substantially concave shaped channel 21 for the sealant 22. Stated another way, the heel portion 20 may be understood as a protrusion extending downward from the shoe protrusion 18 to the floor 14, when installed, and the channel 21 may comprise a substantially quarter circle shaped recess within the heel portion 20 located along a front edge thereof and configured to receive a bead of the sealant 22. However, any size and shape channel 21 is contemplated and the channel 21 may vary in size and shape across one or more cove bases 10.

Figure 4:
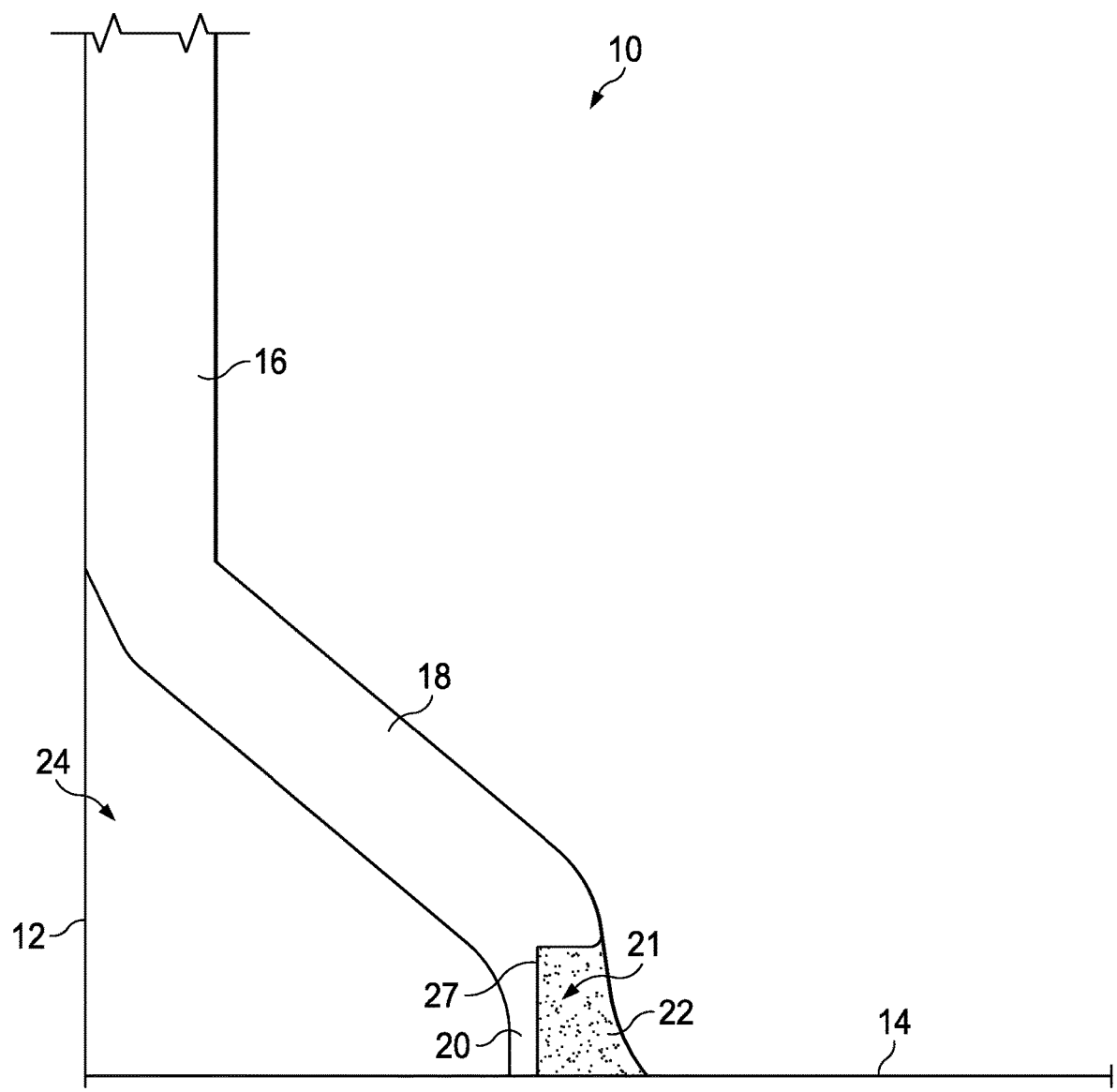
FIG. 4 is a side sectional view of another exemplary embodiment of the cove base.

FIG. 4 is a side sectional view of another exemplary embodiment of the cove base 10. The heel portion 20 may comprise a notched recess 27 which may extend vertically upwards from the floor 14, when installed, and horizontally to a front end of the shoe protrusion 18. Stated another way, the heel portion 20 may be understood as a protrusion extending downward from the shoe protrusion 18 to the floor 14, when installed. The channel 21 may comprise a substantially rectangular or square shaped opening within the heel portion 20 and located along a front edge thereof configured to receive a bead of the sealant 22. However, any size and shape channel 21 is contemplated and the channel 21 may vary in size and shape across one or more cove bases 10. In exemplary embodiments, without limitation, the notched recess 27 may be less than ¼ of an inch in height and less than ¼ of an inch in depth, though any size is contemplated. In other exemplary embodiments, without limitation, the channel 21 may be less than ¼ of an inch in height and less than ¼ of an inch in depth or have a radius of less than ¼ of an inch, though any size is contemplated.

Figure 5:
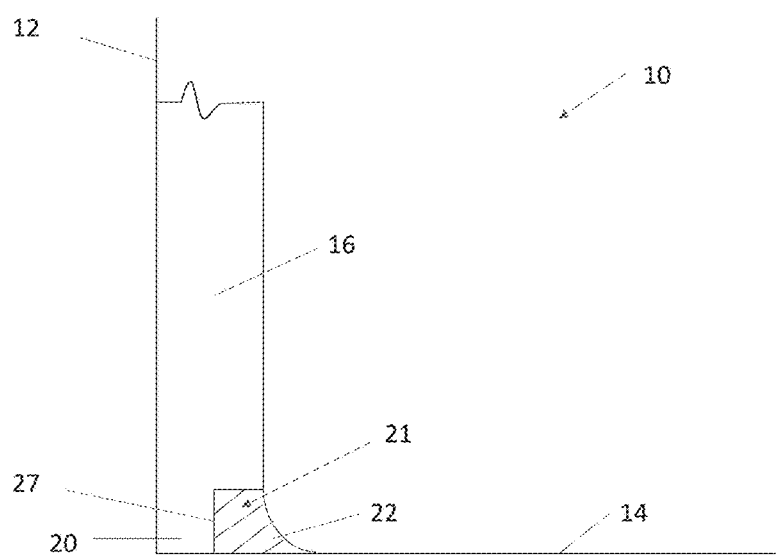
FIG. 5 is a side sectional view of another exemplary embodiment of the cove base.
Figure 6A:
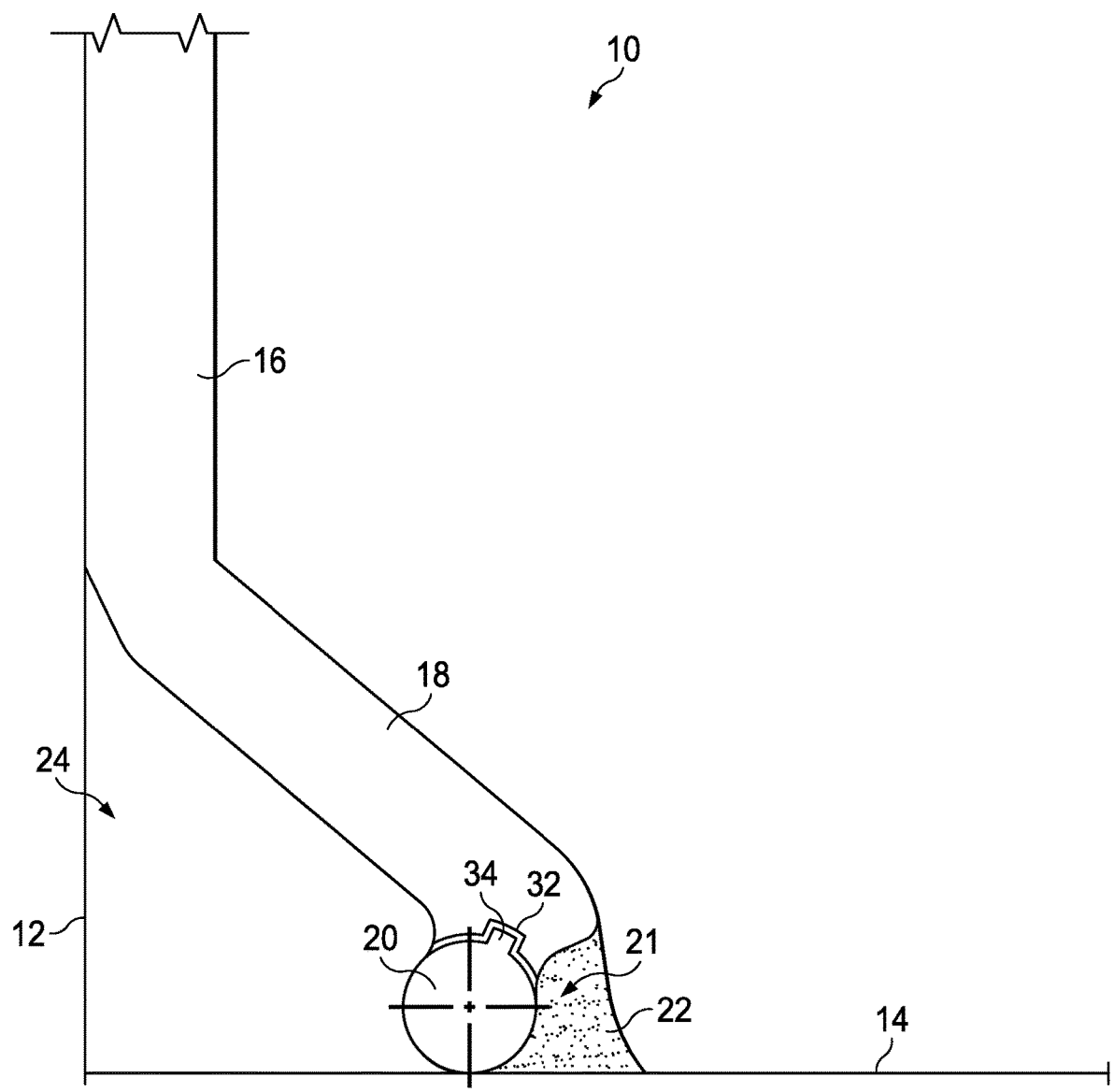
FIG. 6A is a side sectional view of the cove base of FIG. 1 with an attachable heel portion.
Figure 6B:
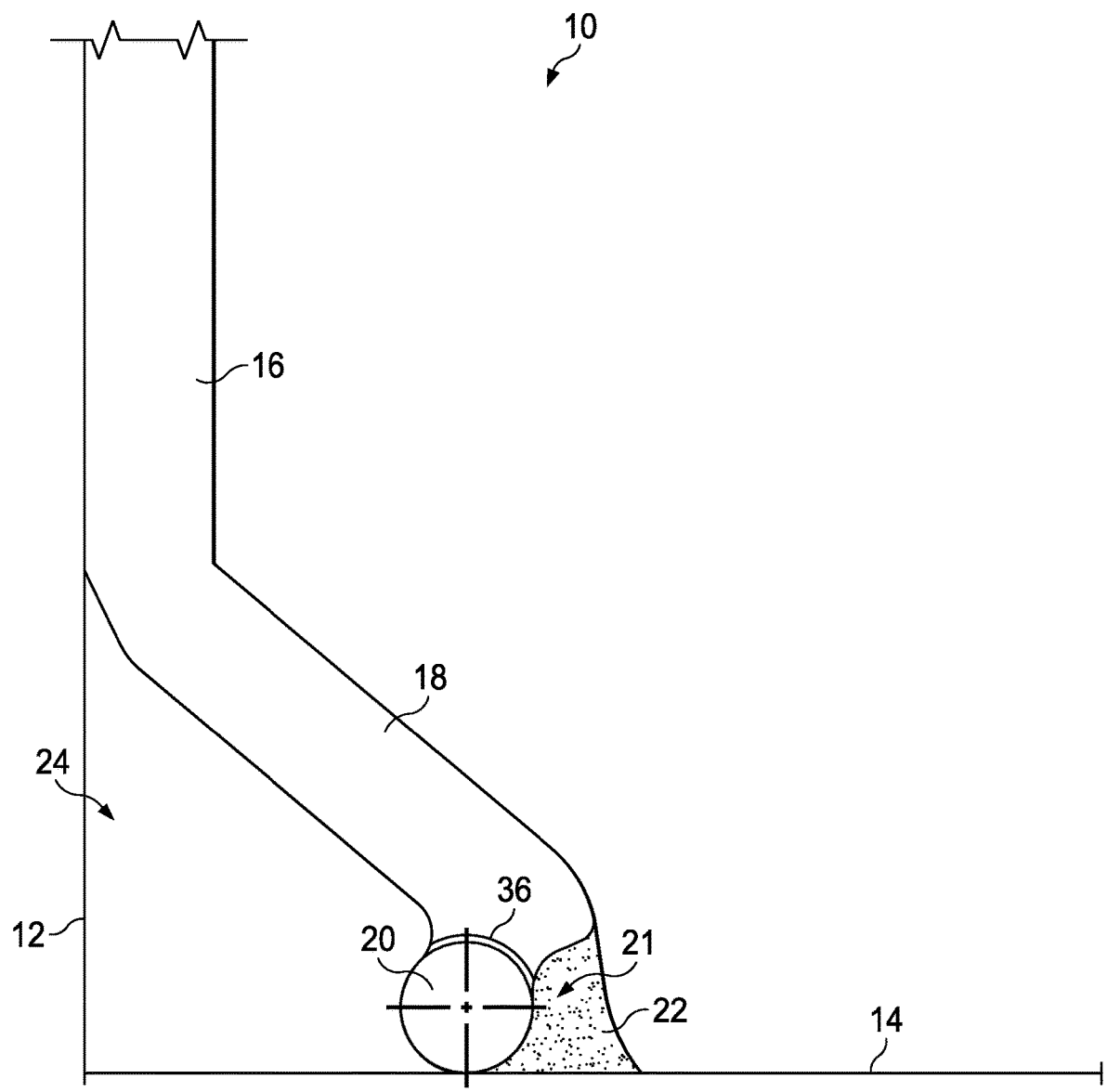
FIG. 6B is a side sectional view of the cove base of FIG. 1 with another exemplary attachable heel portion.
Figure 7:
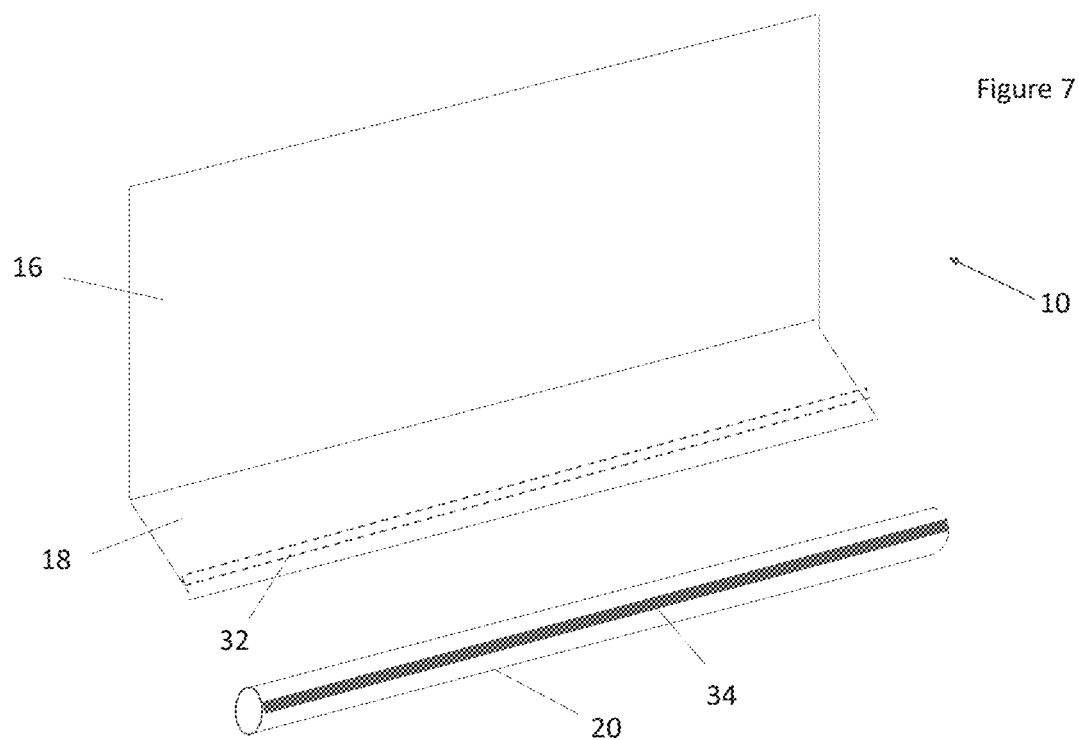
FIG. 7 is a perspective view of an exemplary cove base with a separately formed heel portion in accordance with the present invention.
Figure 8:
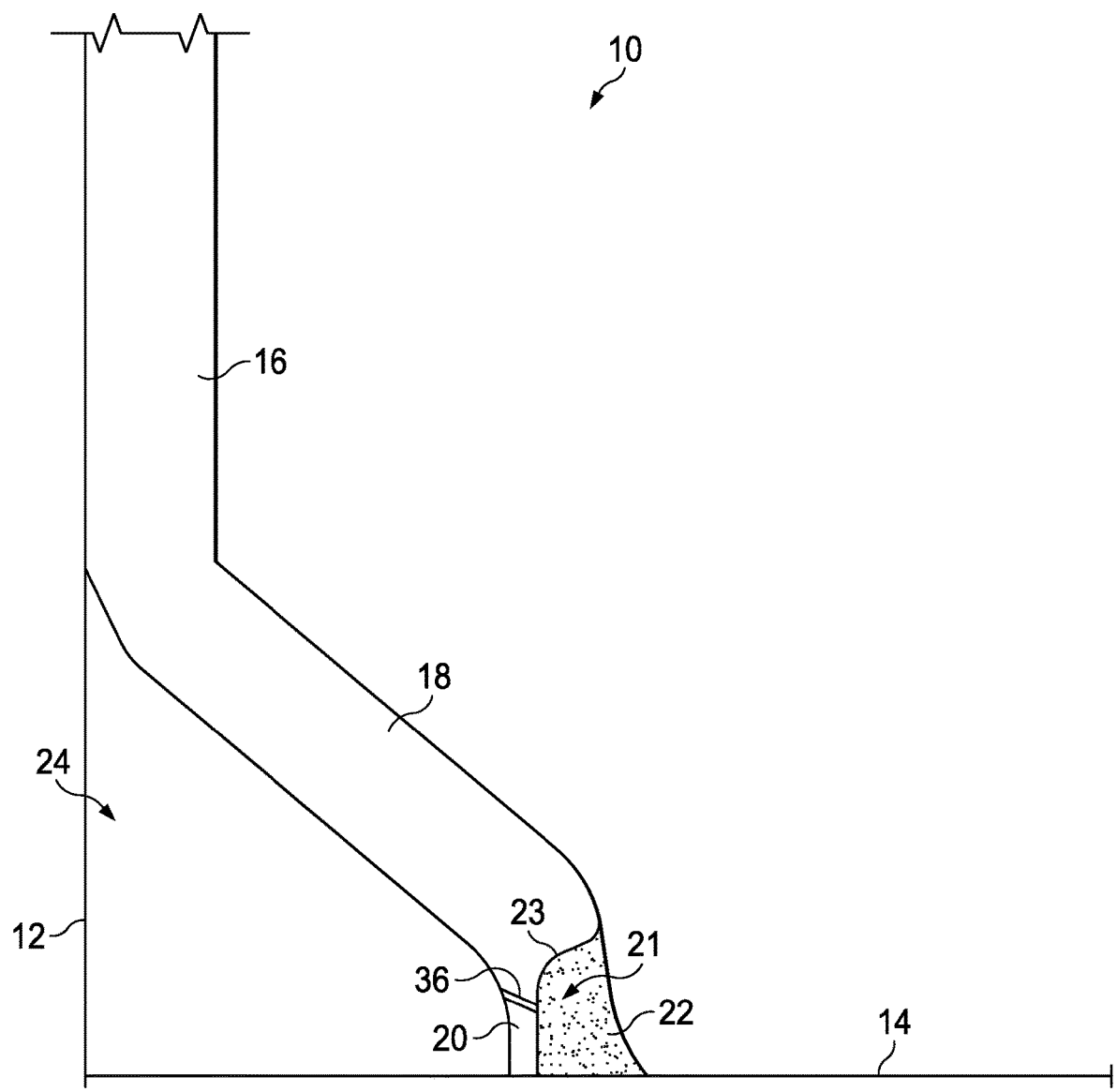
FIG. 8 is a side sectional view of the cove base of FIG. 3 with an attachable heel portion.
Figure 9:
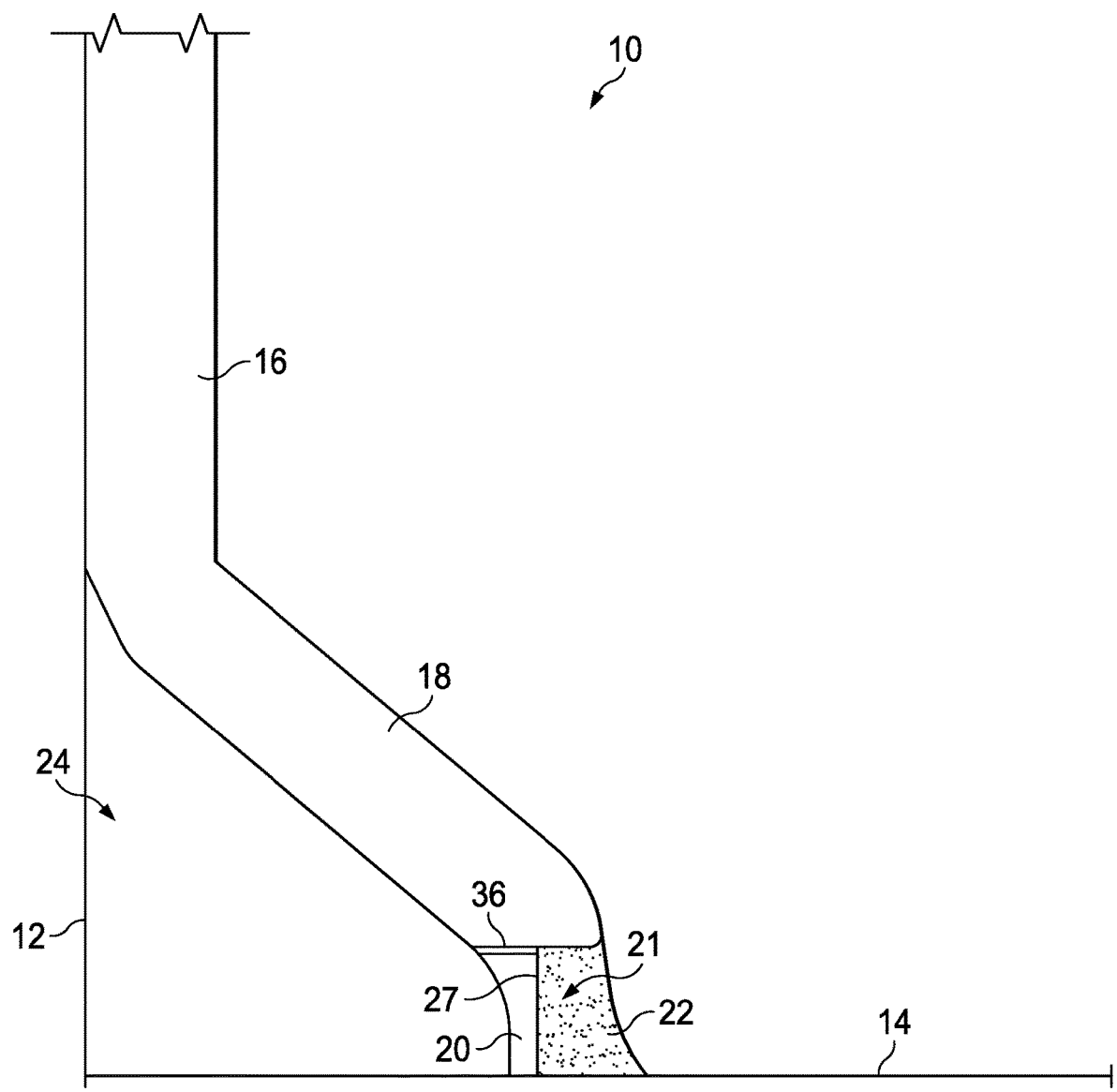
FIG. 9 is a side sectional view of the cove base of FIG. 4 with an attachable heel portion.
Figure 10:
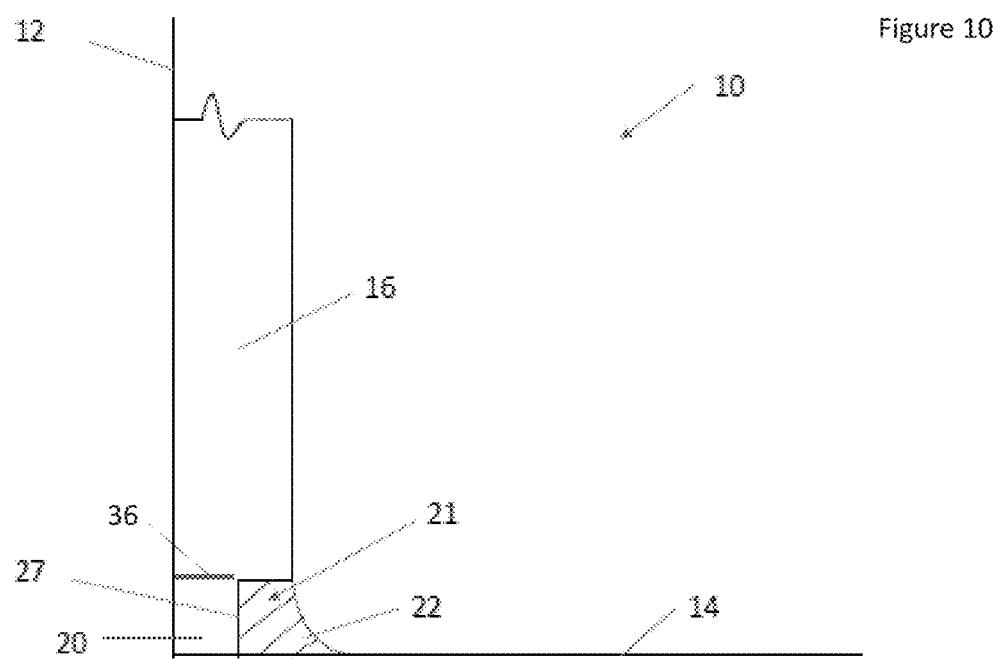
FIG. 10 is a side sectional view of the cove base of FIG. 5 with an attachable heel portion.
Figure 11A:
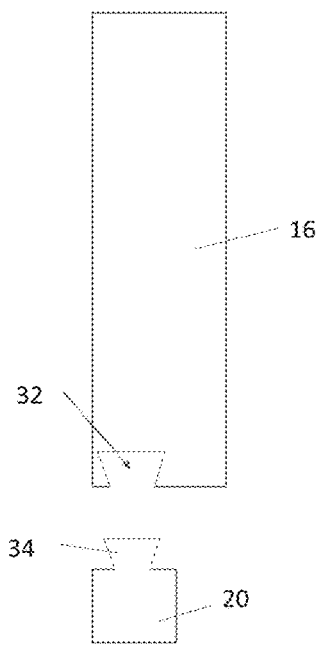
FIG. 11A is a side sectional view of the cove base of FIG. 10 with another exemplary attachable heel portion separated from the base member.
Figure 11B:
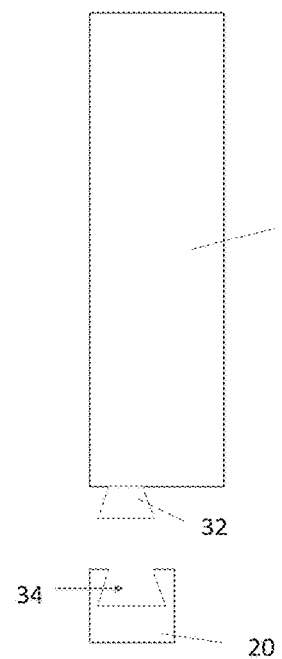
FIG. 11B is a side sectional view of the cove base of FIG. 10 with another exemplary attachable heel portion separated from the base member.
Figure 11C:
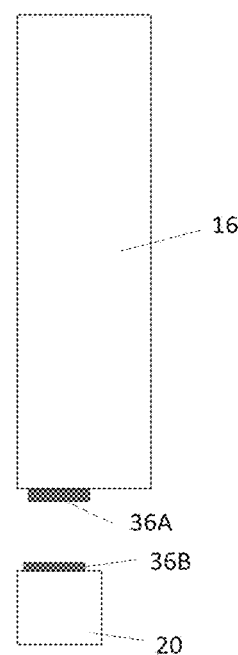
FIG. 11C is a side sectional view of the cove base of FIG. 10 with another exemplary attachable heel portion separated from the base member.
Figure 12A:
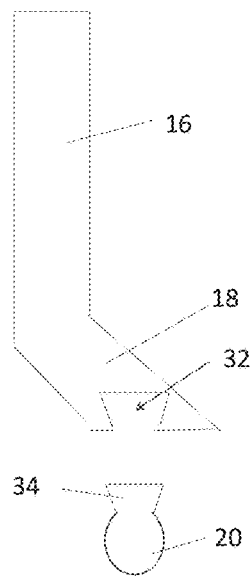
FIG. 12A is a side sectional view of the cove base of FIG. 1 with another exemplary attachable heel portion separated from the base member and shoe protrusion.
Figure 12B:
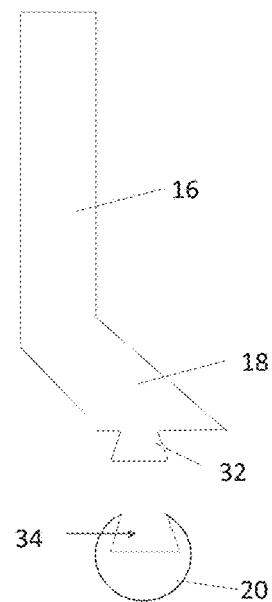
FIG. 12B is a side sectional view of the cove base of FIG. 1 with another exemplary attachable heel portion separated from the base member and shoe protrusion.
Figure 12C:
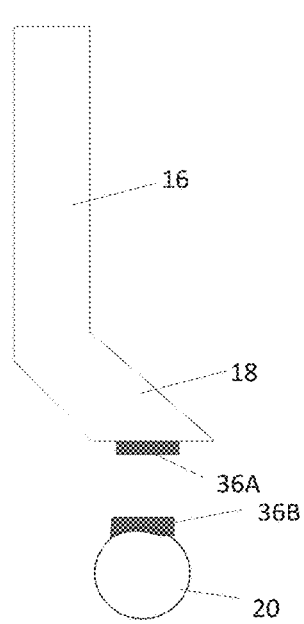
FIG. 12C is a side sectional view of the cove base of FIG. 1 with another exemplary attachable heel portion separated from the base member and shoe protrusion.

FIG. 5 is a side sectional view of another exemplary embodiment of the cove base 10. The cove base 10 may be similar to the cove base 10 shown and described in FIG. 4 however the base member 16 may extend vertically to the floor. The shoe protrusion 18 may not be required or may extend from the base member 16 in a substantially straight line to the floor 14. The heel portion 20 may not be require or may extend from the base member 16 or the shoe protrusion 18 in a substantially straight line to the floor 14.

Any of the cove bases 10 described herein may be comprised of any material, rigid or flexible. Any of the cove bases 10 described herein may comprise a shoe protrusion 18 or not. Furthermore, the use of a heel portion 20 is optional in all shown and described embodiments.

FIG. 6A through FIG. 12C illustrate additional exemplary cove bases 10 with separately formed heel portions 20. The base member 16, and the shoe protrusion 18 where utilized, may be integrally formed with the heel portion 20. In other exemplary embodiments, the heel portion 20 may be separately formed from the base member 16 and/or shoe protrusion 18, where the shoe protrusion 18 is utilized. For example, the shoe protrusion 18, where utilized, and base member 16 may be integrally formed and the heel portion 20 may be separately formed and may be selectively attachable to the shoe protrusion 18, where utilized, and/or the base member 16.

As shown with particular regard to FIGS. 6B, 8-10, 11C, and 12C the heel portion 20 may be attached to the shoe protrusion 18, or where the shoe protrusion 18 is not utilized, the base member 16 by an adhesive 36. The adhesive 36 may comprise any type of kind of adhesive including, but not limited to, glue, tape (double or single sided), epoxy, sealant 22, combinations thereof, or the like. The adhesive 36 may be deposited on one or both of the heel portion 20 and the shoe protrusion 18, or where the shoe protrusion 18 is not utilized, the base member 16. Where deposited on both portions of the cove base 10, such as by first portion 36A and 36B, the same of different type or kind of adhesive 36 may be so deposited. The adhesive 36 may be deposited in a continuous or intermittent fashion. The adhesive 36 may be deposited along some or all of a length of the wall base 10. The adhesive 36 may be deposited by a manufacturer or end user of the cove base 10.

Alternatively, or additionally, the heel portion 20 may be attached to the shoe protrusion 18, or where the shoe protrusion 18 is not utilized, the base member 16 by the sealant 22 deposited within the channel 21, with or without the need for other attachment means shown and/or described herein.

As shown with particular regard to FIGS. 6A, 7, 11A-11B, and 12A-12B, the heel portion 20 may comprise a first attachment portion 32 configured to mate with a second attachment portion 34 located at the shoe protrusion 18, or where the shoe protrusion 18 is not utilized, the second attachment portion 34 may be located at the base member 16. The first and second attachment portions 32 and 34, respectively, may comprise mating tongue and groove joints, rabbit joints, mortise and tenon joints, box joints, dados, biscuit joints, dovetail joints, slots, snap fit pieces, protrusions, recesses, press fit pieces, combination thereof, or the like. The first and second attachment portions 32 and 34, respectively, may be utilized by themselves and/or in combination with either or both of the sealant 22 and adhesive 36 for securing the heel portion 20 to the shoe protrusion 18, or where the shoe protrusion 18 is not utilized, the base member 16. The first and second attachment portions 32 and 34, respectively, may alternatively or additionally be used to properly align the heel portion 20 with a reminder of the cove base 10. The first and second attachment portions 32 and 34, respectively, may extend some or all of a length of the wall base 10.

As shown with particular regard to FIGS. 11A-11B and 12A-12B, in exemplary embodiments, the first and second attachment portions 32 and 34, respectively, may be configured for lateral attachment by sliding movement relative to one another. The first and second attachment portions 32 and 34, respectively, in such exemplary embodiments may be configured to prevent separation of said heel portion 20 from the shoe protrusion 18, or where the shoe protrusion 18 is not utilized, the base member 16, by vertical movement when said first attachment portion 32 is mated with said second attachment portion 34. This may be realized by forming the first and/or second attachment portion 32 and 34, respectively, in shapes configured to resist vertical separating forces, such as but not limited to, dovetail joints.

FIG. 13A and FIG. 13B illustrate other exemplary embodiments whereby the heel protrusion 20 may overlap with a portion of the shoe protrusion 18, or where the shoe protrusion 18 is not utilized, the base member 16. Any portion of the heel protrusion 20 may overlap with any portion of the shoe protrusion 18 and/or base member 16. Such overlapping may be sufficient to secure the heel protrusion 20 to the shoe protrusion 18 and/or base member 16. As shown with particular regard to FIG. 13B, adhesive 36, fasteners, sealant 22, combinations thereof, or the like may optionally be used to secure, or further secure, the heel protrusion 20 with the overlapping portion of the shoe protrusion 18 and/or base member 16, though such is not required.

FIG. 14A through FIG. 14E illustrate another exemplary embodiment of the cove base 10. The shoe protrusion 18 may comprise a substantially linear shape. The shoe protrusion 18 may comprise a forward portion 18A which extends forward of at least a portion of the heel protrusion 20. The heel protrusion 20 may extend from a mid-portion of the shoe protrusion 18, which may be between either extreme end of the shoe protrusion 18 but not necessarily in the exact middle thereof. At least a portion of a forward surface 15 of the heel protrusion 20, in exemplary embodiments, may comprise a curved surface such that at least a portion of the channel 21 forms a generally semi-circular shape. However, any size and shape heel protrusion 20 may be utilized. In exemplary embodiments, the heel protrusion 20 may initially extend downward, or downward and slightly rearward relative to a forward and/or rearward surface of the base member 16 and/or wall 30, from the shoe protrusion 18 and may subsequently curve to extend downward and slightly forward relative to the forward and/or rearward surface of the base member 16 and/or wall 30 towards the floor 14.

The forward portion 18A of the shoe protrusion 18 may extend downward to cover at least a portion of the forward surface 15 of the heel protrusion 20. The forward portion 18A of the shoe protrusion 18 may comprise a flexible or semi-flexible material such that at least a portion of the forward portion 18A may be lifted before or after full or partial installation of the cove base 10, such as to deposit sealant 22 within the channel 21. The forward portion 18A may comprise a fully or partially resilient material such that the forward portion 18A may be configured to return to its original position after being lifted, or a close approximate thereof. Alternatively, or additionally, the forward portion 18A may be manually pushed into position. The forward portion 18A may be secured in place by the sealant 22 deposited within the channel 21, particularly once cured. The sealant 22 may be deposited within the channel 21 in a continuous or intermittent fashion to fully or partially seal the cove base 10 to the floor 14 or other surface.

A lower surface of the forward portion 18A may be configured to remain elevated above the floor 14 when the cove base 10 in installed, such as to form a gap 17 which forms part of, and facilitate access to a remaining portion of, the channel 21. In other exemplary embodiments, the forward portion 18A may be configured to contact the floor 14 or other surface when the cove base 10 in installed, and the forward portion 18A may be lifted to form the gap 17 and/or access the channel 21.

The heel protrusion 20 may be integrally formed with the cove base 10, or may be attachable thereto using any of the embodiments shown and/or described herein.

Figure 14A:
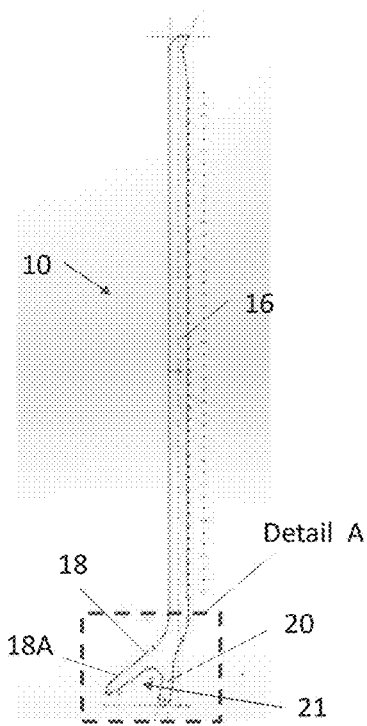
FIG. 14A is a side sectional view of another exemplary embodiment of the cove base of FIG. 1.
Figure 14B:
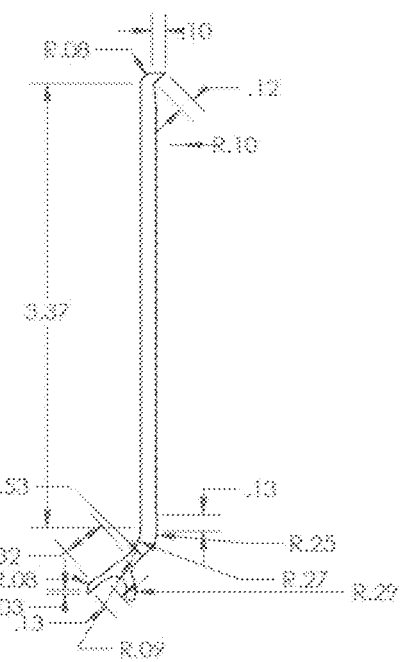
FIG. 14B is the side sectional view of FIG. 14A with exemplary dimensions indicated.
Figure 14C:
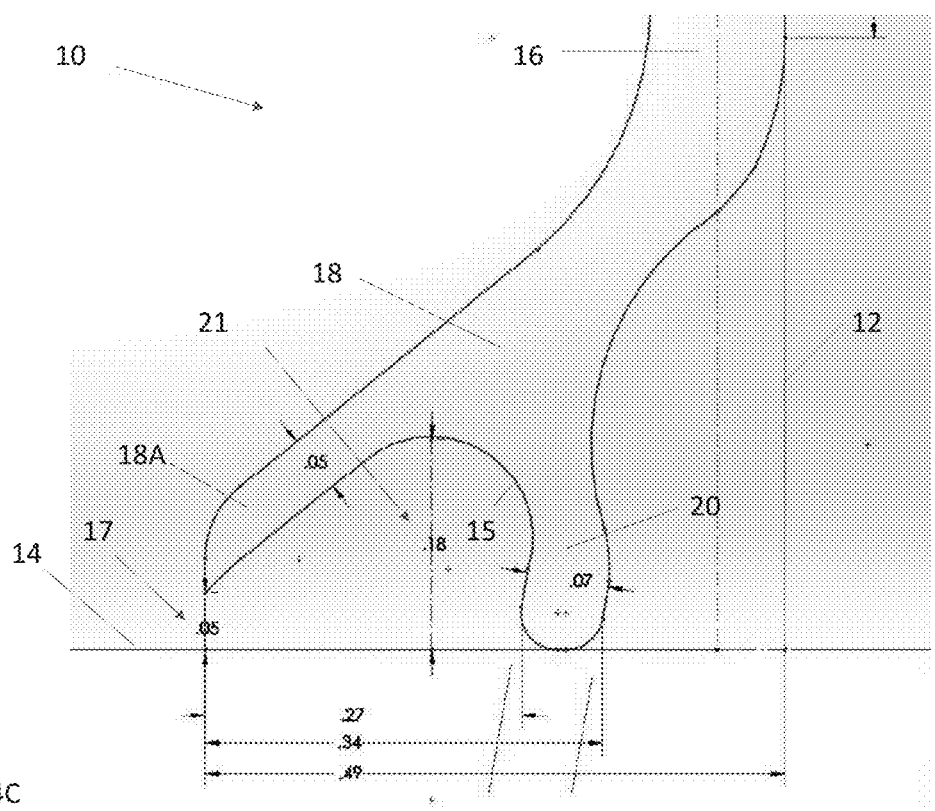
FIG. 14C is a detailed side sectional view of detail A FIG. 14A with exemplary dimensions indicated.
Figure 14D:
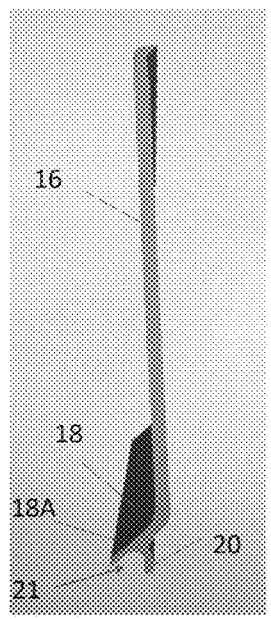
FIG. 14D is a right side view of the cove base of FIG. 14A.
Figure 14E:
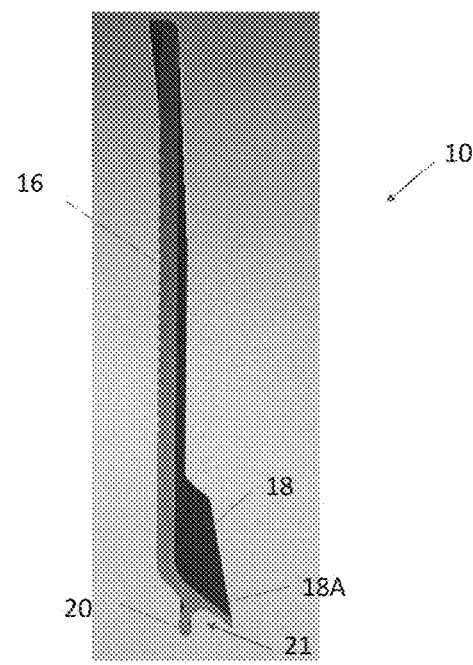
FIG. 14E is a left side view of the cove base of FIG. 14A.

The dimensions shown in at least FIG. 14B-14C are merely exemplary and are not intended to be limiting. Any size or shape cove base 10 and components thereof may be utilized.

The cove base 10 may be installed at any type or kind of wall 30 and/or floor 14 or other surfaces.

The shoe protrusion 18 may also be referred to as an extension member. The heel protrusion 20 may also be referred to as a protrusion. The cove base 10 may also be referred to as a wall base.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A wall base comprising:
   a base member comprising a forward surface and a rear surface configured to be secured to an adjacent forward surface of a wall, wherein the rear surface and the forward surface extend in a vertical direction;
   an extension member normally extending outward and downward from the forward surface of the base member;
   a protrusion extending downward from the extension member to contact a floor surface when said wall base is installed; and
   a channel defined, at least in part, by said extension member and said protrusion and configured to receive a sealant;
   wherein said protrusion is separately formed from said base member and said extension member, and is attachable to said extension member by way of adhesive;
   wherein said base member comprises a bottom surface which is spaced apart from a bottom surface of the extension member and the protrusion.

2. The wall base of claim 1 wherein:
   said protrusion comprises a circular cross section.

3. The wall base of claim 1 wherein:
said base member and said extension member are integrally formed.

4. The wall base of claim 1 further comprising:
a first attachment portion located at a lower portion of said extension member; and
a second attachment portion located at an upper portion of said protrusion, wherein said second attachment portion is configured to mate with said first attachment portion.

5. The wall base of claim 4 wherein:
said first attachment portion comprises a tongue;
said second attachment portion comprises a groove; and
said tongue and said groove are configured for lateral attachment by sliding movement relative to one another and are configured to prevent separation of said extension member from said protrusion by non-lateral movement when said tongue is mated with said groove.

6. The wall base of claim 4 wherein:
said base member extends a length;
said first attachment portion extends continuously along the length of said wall base; and
said second attachment portion extends continuously along the length of said wall base.

7. The wall base of claim 4 wherein:
said first attachment portion comprises a recess; and
said second attachment portion comprises a mating protrusion.

8. The wall base of claim 4 wherein:
said first attachment portion comprises a mating protrusion; and
said second attachment portion comprises a recess.

9. The wall base of claim 1 wherein:
said adhesive is provided at double-sided tape interposed between said protrusion and said extension member.

10. The wall base of claim 1 wherein:
said extension member comprises a forward portion which is configured to be selectively lifted to access the channel.

11. The wall base of claim 10 wherein:
said extension member is configured to contact the floor when the wall base is installed.

12. The wall base of claim 10 wherein:
at least the forward portion of the extension member comprises a flexible and resilient material.

13. A method for providing a sealed connection between a wall and a floor, said method comprising the steps of:
providing a base member and an extension member, wherein the extension member normally extends outward and downward from the base member;
attaching a heel portion, which is separately formed from said extension member and said base member, to said extension member at least in part by applying adhesive between said heel portion and said extension member such that the heel portion extends downward from the extension member;
securing a rear surface of the base member to an adjacent forward surface of the wall such that the heel portion contacts said floor; and
depositing a sealant within a channel defined, at least in part, by said extension member, said heel portion, and said floor to provide a sealed connection between said wall and said floor.

14. The method of claim 13 wherein:
the step of attaching said heel portion to said extension member comprises the sub-steps of mating a first attachment portion provided at said heel portion to a second attachment portion provided at said extension member.

15. The method of claim 13 wherein:
said extension member and said base member are integrally formed; and
said heel portion is attached to said extension member, at least in part, by application of said sealant within said channel.

16. A wall base for providing a sealed connection between a wall and a floor, said wall base comprising:
a base member comprising a planer rear surface configured to be secured to an adjacent forward surface of a wall;
an extension member in the form of a unitary surface extending at an acute, non-zero angle from, and outward beyond, a vertically extending front surface of said base member, said extension member extending from, and downward beyond, a lower surface of said base member;
a protrusion extending downward from a mid-portion of a lower surface of said extension member such that at least a portion of said protrusion is configured to contact said floor when installed; and
a channel defined by a forward surface of said protrusion and said lower surface of said extension member, wherein said channel is configured to receive a sealant for providing said sealed connection between said wall and said floor by way of said wall base.

17. The wall base of claim 16 further comprising:
an attachment means for selectively attaching said protrusion to said extension member, wherein said protrusion is separately formed from said base member and said extension member.

18. The wall base of claim 16 wherein:
the channel comprises a unitary, curved forward surface for receiving the sealant.

* * * * *